United States Patent
Paradis et al.

(10) Patent No.: US 7,780,247 B2
(45) Date of Patent: Aug. 24, 2010

(54) TRACK BELT GUIDE WHEELS ASSEMBLY

(75) Inventors: Michel Paradis, Granby (CA); Rémy Oddo, Rock-Forest (CA)

(73) Assignee: Camoplast Inc. (CA)

( * ) Notice: Subject to any disclaimer, the term of this patent is extended or adjusted under 35 U.S.C. 154(b) by 0 days.

(21) Appl. No.: 11/966,467

(22) Filed: Dec. 28, 2007

(65) Prior Publication Data
US 2008/0100133 A1 May 1, 2008

Related U.S. Application Data

(63) Continuation-in-part of application No. 11/058,579, filed on Feb. 15, 2005, now abandoned.

(30) Foreign Application Priority Data

Feb. 17, 2004 (CA) .................................. 2457999

(51) Int. Cl.
B62D 55/096 (2006.01)
(52) U.S. Cl. ...................... 305/165; 305/157; 305/169; 305/178
(58) Field of Classification Search ................ 305/120, 305/121, 124, 127, 128, 129, 130, 131, 132, 305/142, 157, 165, 167, 168, 169, 178, 179, 305/194; 180/9.3
See application file for complete search history.

(56) References Cited

U.S. PATENT DOCUMENTS

| | | | | |
|---|---|---|---|---|
| 2,025,999 A * | 12/1935 | Myers | .......................... | 305/165 |
| 3,386,778 A | 6/1968 | Rymes | | |
| 3,722,961 A * | 3/1973 | Haley et al. | .................. | 305/127 |
| 3,781,067 A * | 12/1973 | Dodson et al. | .............. | 305/168 |
| 3,877,534 A | 4/1975 | Krause | | |
| 3,887,243 A * | 6/1975 | Chaumont | .................. | 305/128 |
| 4,023,865 A * | 5/1977 | Morissette | .................. | 305/168 |
| 5,709,440 A | 1/1998 | Lecours | | |
| 5,713,645 A * | 2/1998 | Thompson et al. | .......... | 305/168 |
| 6,068,354 A | 5/2000 | Akiyama et al. | | |
| 6,112,840 A * | 9/2000 | Forbes | ......................... | 180/193 |
| 6,206,124 B1 | 3/2001 | Mallette et al. | | |
| 6,609,771 B2 | 8/2003 | Morin et al. | | |
| 6,626,258 B1 | 9/2003 | Forbes | | |
| 7,128,176 B1 | 10/2006 | Mills et al. | | |
| 7,159,955 B2 * | 1/2007 | St-Pierre et al. | ............. | 305/168 |
| 2003/0201128 A1 | 10/2003 | Girouard et al. | | |
| 2007/0063584 A1* | 3/2007 | St-Pierre | ..................... | 305/169 |

FOREIGN PATENT DOCUMENTS

| | | |
|---|---|---|
| CA | 995718 | 8/1976 |
| CA | 1003012 | 1/1977 |
| CA | 1030195 | 4/1978 |

(Continued)

*Primary Examiner*—S. Joseph Morano
*Assistant Examiner*—Kip T Kotter
(74) *Attorney, Agent, or Firm*—Akerman Senterfitt

(57) ABSTRACT

An endless belt body for a track assembly, comprising through holes, between traction lugs of the ground-engaging surface thereof, along a length thereof, located in at least one of: i) the central region of a width of the endless belt body, and ii) on the lateral parts of the width of the endless belt body.

54 Claims, 6 Drawing Sheets

| | FOREIGN PATENT DOCUMENTS | | | CA | 1081292 | 7/1980 |
|---|---|---|---|---|---|---|
| | | | | CA | 1098567 | 3/1981 |
| CA | 1044284 | 12/1978 | | CA | 1296374 | 2/1992 |
| CA | 1046112 | 1/1979 | | CA | 2143802 | 8/1996 |
| CA | 1046562 | 1/1979 | | CA | 2182845 | 3/1999 |
| CA | 1047582 | 1/1979 | | CA | 2332224 | 7/2002 |
| CA | 1051957 | 4/1979 | | CA | 2337466 | 8/2002 |
| CA | 1057799 | 7/1979 | | * cited by examiner | | |

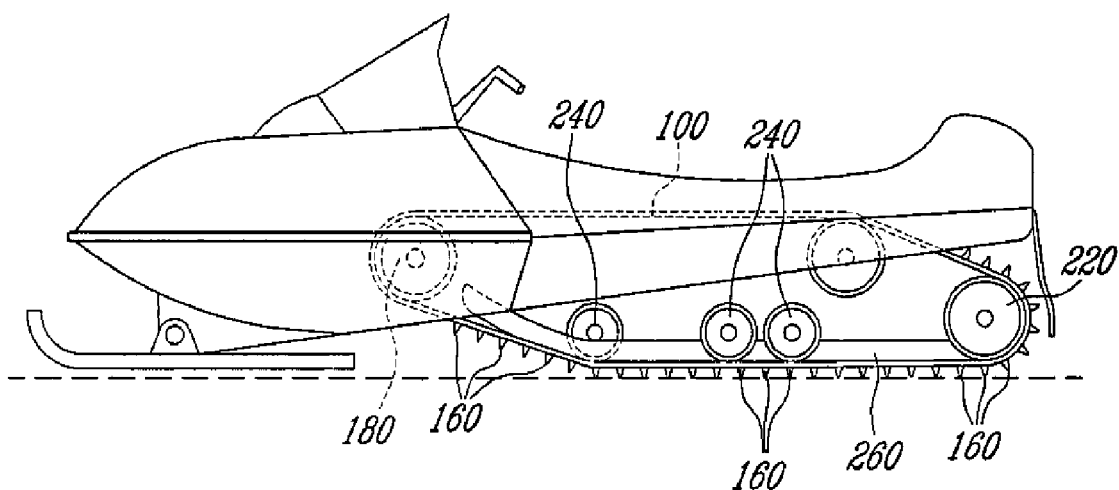
FIG_1 (PRIOR ART)

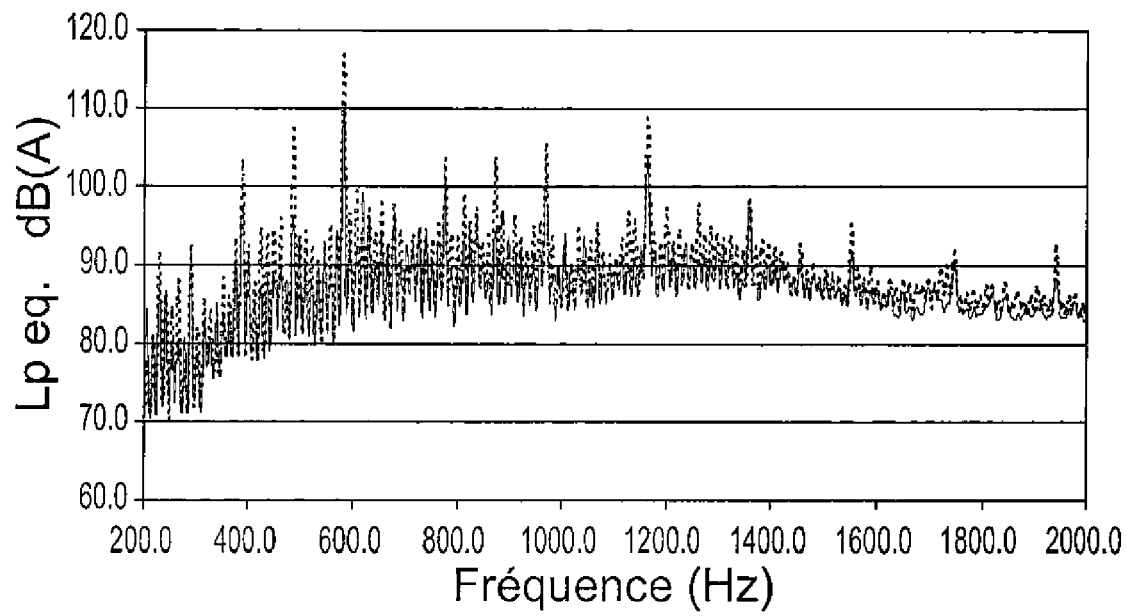
FIG_3A
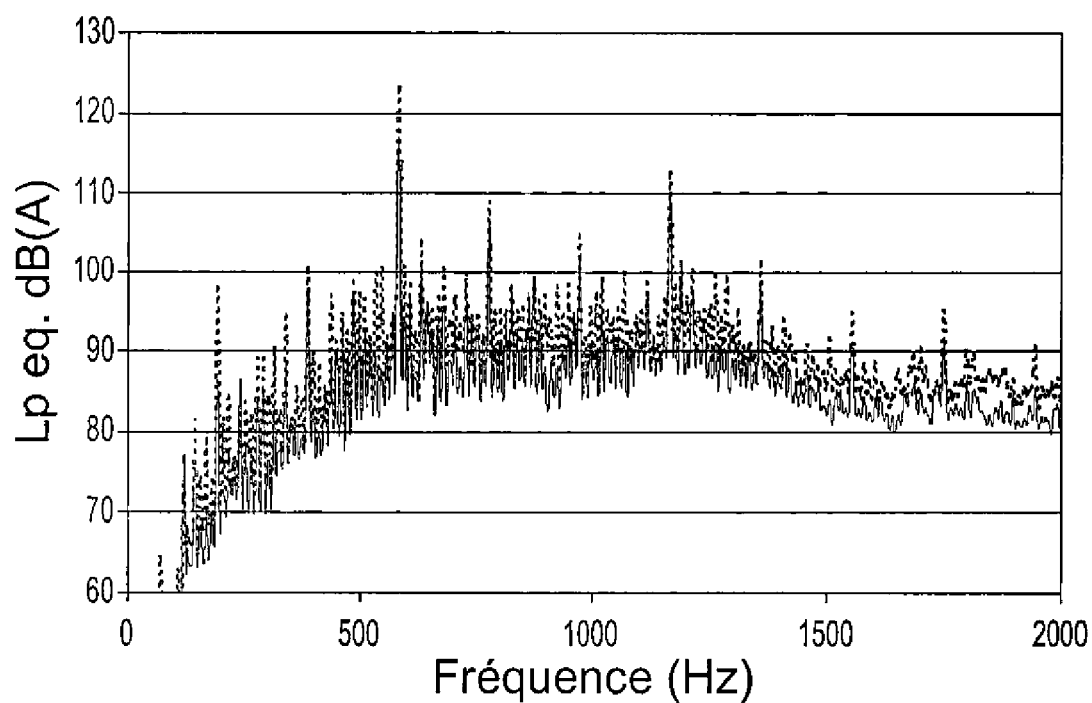
FIG_3B

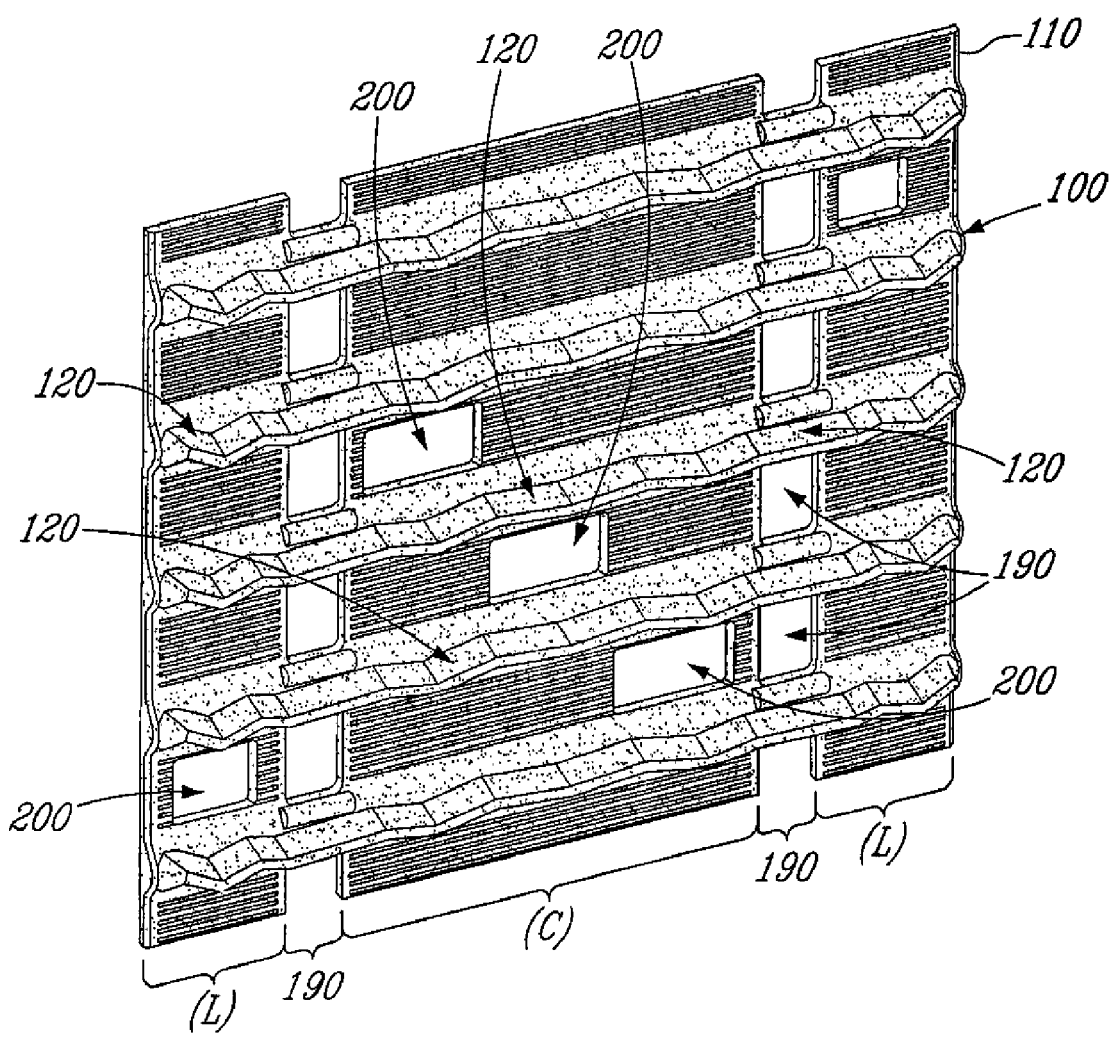
FIG_4

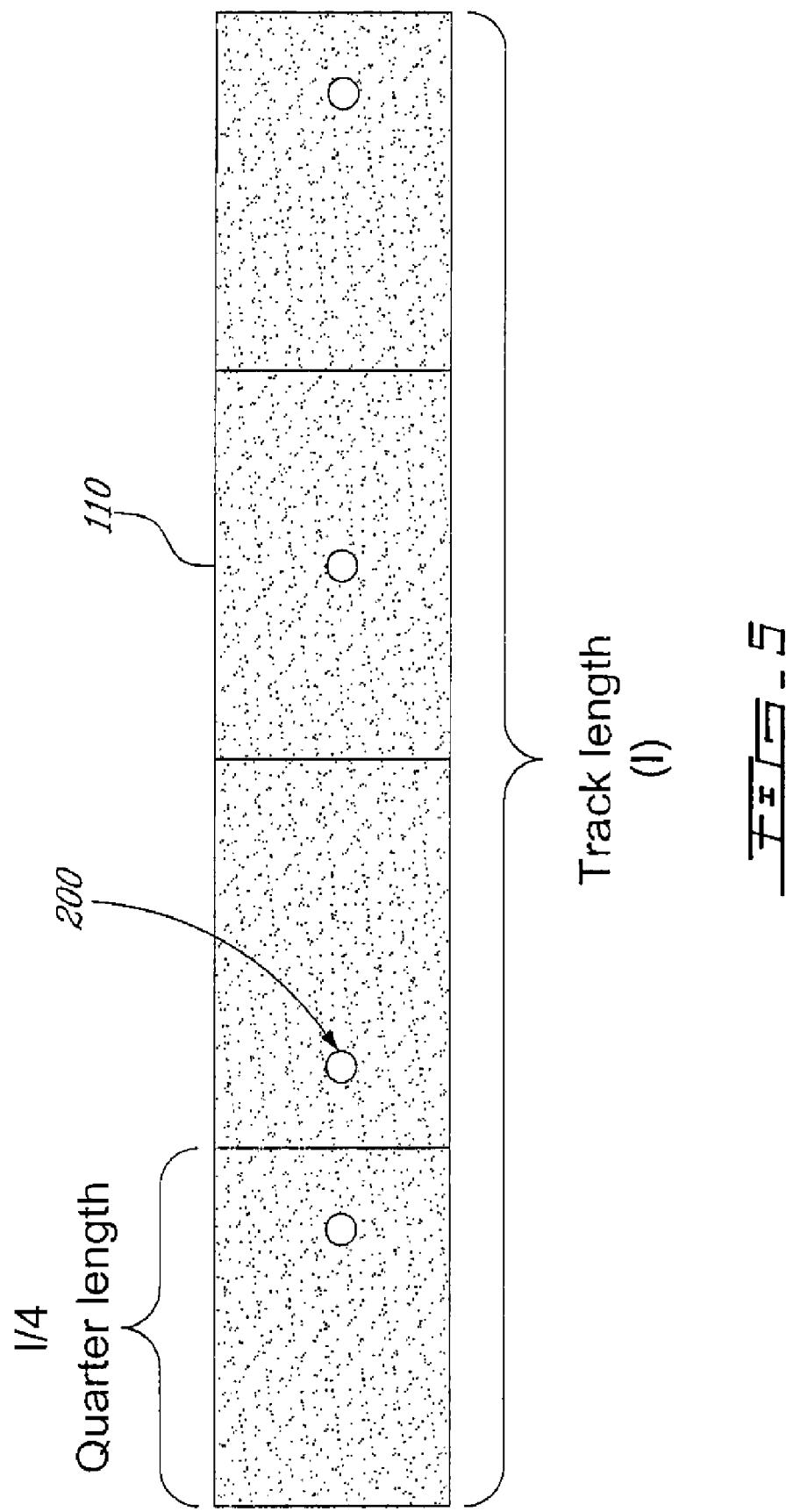

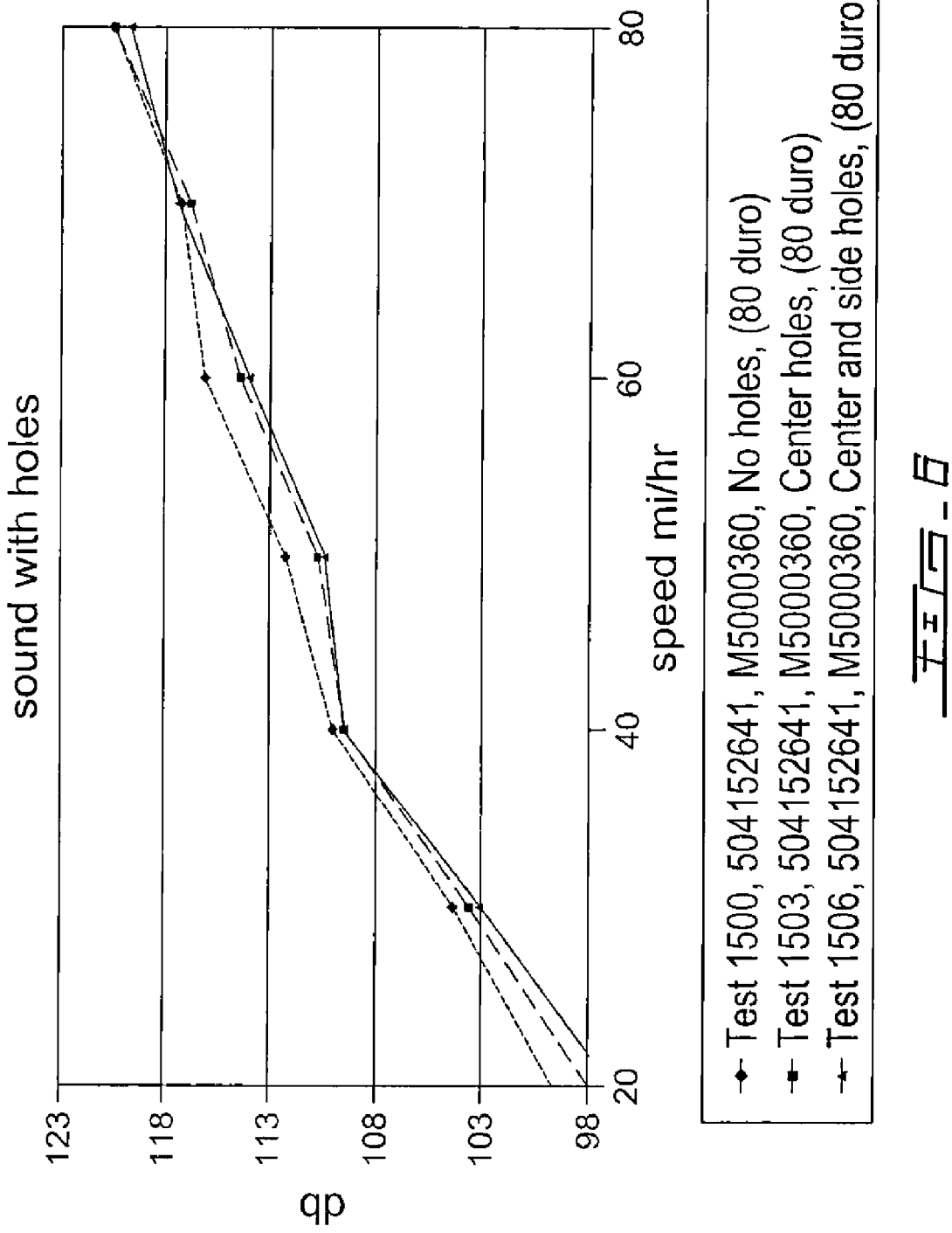

US 7,780,247 B2

TRACK BELT GUIDE WHEELS ASSEMBLY

CROSS REFERENCE TO RELATED APPLICATION

This application is a continuation-in-part of application of U.S. patent application Ser. No. 11/058,579 now pending, which itself claims priority on Canadian application no 2,457,999 filed on Feb. 17, 2004. All documents above are herein incorporated by reference.

FIELD OF THE INVENTION

The present invention relates to endless track belts. More specifically, the present invention is concerned with a noiseless track belt assembly.

BACKGROUND OF THE INVENTION

An endless track belt assembly for propelling a snowmobile over snow, ice, or other similar ground structure typically, as illustrated for example in FIG. 1, comprises an endless elongated body 100 going around a rear wheel 220 and a front wheel 180, and having a ground-engaging outer surface and an inner surface. The track belt assembly receives and supports, on a lower run thereof, a suspension comprising a plurality of guide wheels 240, and guide rails 260. The ground-engaging surface typically bears a series of spaced traction lugs 160.

In FIG. 2(A), small guiding wheels 10 are positioned transversally in aligned pairs along guide rails 12 of the track, shocks being provided between the guide rails 12.

It is known that the noise generated by tracked vehicle such as snowmobiles is essentially produced by the endless belt track thereof. An analysis of a frequency spectrum of the noise generated by a tracked vehicle shows a main peak at a frequency corresponding to a driving frequency of the track belt and to harmonics thereof.

The driving frequency $F_e$ of the track belt may be calculated from a number n of tooth of the wheel and a speed of rotation rpm of the wheel in turn per minute, using the following relation:

$$F_e = \frac{n \cdot rpm}{60}$$

Since the track has a constant pitch, factors that may modify the driving frequency thereof may comprise the mounting of the wheel, an action of the guiding wheels on the reinforcing rods, an action of the small guiding wheels on the guide rails, an action of the traction clips on the guide rails and an impact of the profiles with the ground, for example.

One of several methods actually contemplated for reducing an occurrence of peaks in acoustic spectra of tracked vehicle associated with repetitive events consists of breaking such repetitive sequences by causing a random spreading of the different events submitted to the track. The result is a distribution of energy on different harmonics of the critical frequency Fe.

It has been suggested to create such a random spreading by providing non-regular profiles on the ground-engaging surface of the track for example.

It has also been suggested to provide clips on each profile of the track.

There is still a need in the art for endless track belts producing reduced noise.

SUMMARY OF THE INVENTION

More specifically, there is provided a track assembly comprising an endless elongated body going around a rear wheel and a front wheel, said body having an inner surface and a ground-engaging outer surface, the ground-engaging outer surface being provided with traction lugs, wherein the endless elongated body comprises open holes along a length thereof, between traction lugs.

There is further provided a belt assembly, comprising a rear wheel, a front wheel, an endless elongated belt body disposed around the rear wheel and the front wheel, the track belt body having a ground-engaging outer surface and an inner surface, and defining a longitudinal direction of the assembly; and a suspension comprising a plurality of pairs of guide wheels attached to guide rails running between the front wheel and the rear wheel, the guide wheels being all located in a front region, close to the front wheel, of a length of about at most a third of the length of the guide rails, and being supported on the inner surface of the track belt body; wherein a pair of guide wheels is staggered such that each wheel of the pair is in a staggered position with respect to its counterpart such that the wheels of the staggered pair do not simultaneously impact the inner surface on rotation of the track belt, and wherein the endless elongated track belt body is provided with through holes.

Other objects, advantages and features of the present invention will become more apparent upon reading of the following non-restrictive description of embodiments thereof, given by way of example only with reference to the accompanying drawings.

BRIEF DESCRIPTION OF THE DRAWINGS

In the appended drawings:

FIG. 1, labelled "Prior Art", is a perspective view of a snowmobile as known in the art;

FIG. 3(A) and FIG. 3(B) show a noise frequency spectra of an assembly as known in the art (dotted lines) and a noise frequency spectrum a vehicle of an assembly according to an embodiment of the present invention (full lines);

FIG. 4 shows a partial view of an endless track according to a further embodiment of the present invention;

FIG. 5 shows schematically a distribution of holes in an endless track according to an embodiment of the present invention; and FIG. 6 illustrates results of sound produced by a tracked vehicle, when the track belt contains holes located in the center portion of the track belt (squares); when the track belt contains holes located both in the center and in the lateral portions of the track belt (triangles); and when the track belt is devoid of holes (diamonds).

DESCRIPTION OF EMBODIMENTS OF THE INVENTION

Figure 2A:
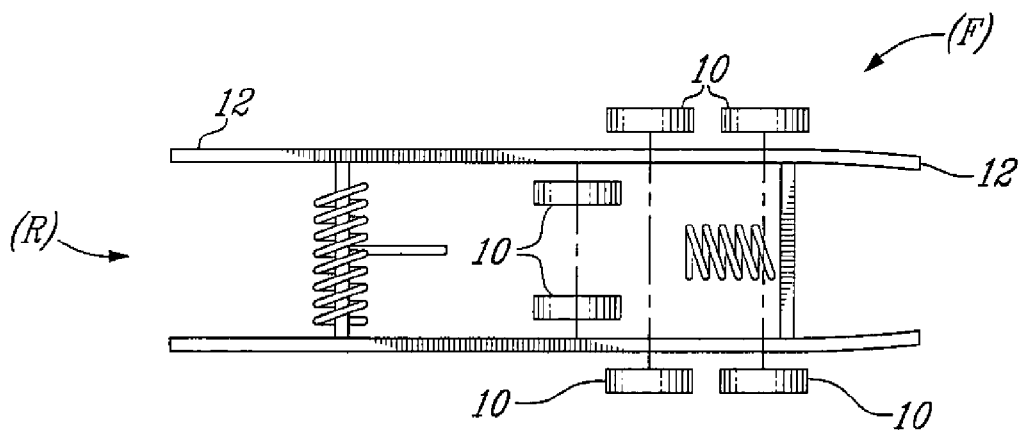
FIG. 2(A), labelled "Prior Art", is a schematic diagram of an assembly as known in the art.

Tests performed on a variety of such conventional assemblies as illustrated in FIG. 2(A) show that the noise generated at the level of the guide wheels 10 is highly dependent on a positioning thereof. It is found that guide wheels located in a rear region (R) or in a region of the assembly adjacent this rear region are a main source of noise. A zone situated in a forward region (F) of the assembly is found to be a silent region.

Figure 2B:
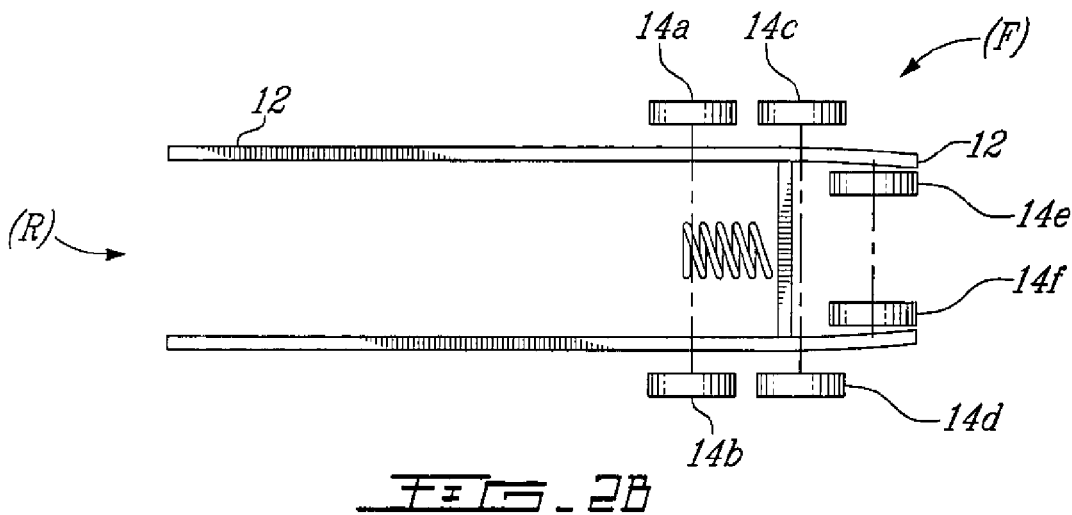
FIG. 2(B) is a is a schematic diagram of an assembly according to an embodiment of the present invention.

An assembly according to the present invention is provided with guide wheels located only in the forward region (F) of the assembly, the rear region (R) being devoid of guide wheels (see FIGS. 2(A) and 2(B)).

As illustrated in FIG. 2(B), guide wheels 14 may be located in aligned pairs 14a-14b; 14c-14d; and 14e-14f, in the forward region (F) of the assembly, the rear region (R) being devoid of guide wheels, in such a way that a first group of guide wheels 14e-14f is located close to an extremity of the rails 12 where the rails 12 are bent, in the forward region (F) of the assembly.

Figure 2C:
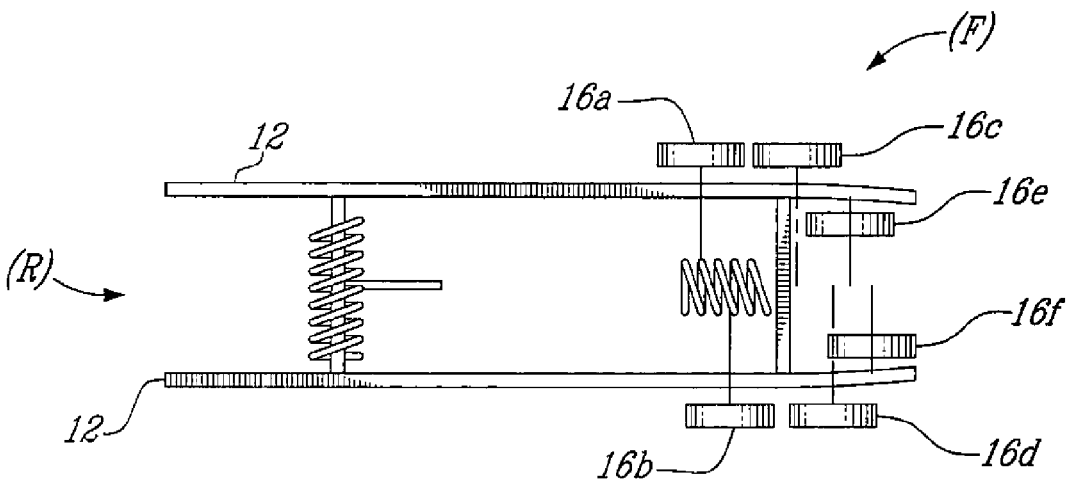
FIG. 2(C) is a is a schematic diagram of an assembly according to a further embodiment of the present invention

As illustrated in FIG. 2(C), the guide wheels 16 may be located in non-aligned pairs 16a-16b; 16c-16d; and 16e-16f in the forward region (F) of the assembly, the rear region (R) being devoid of guide wheels, in such a way that a first group of guide wheels 16e-16f is located close to region where the rails 12 are bent, in the forward region (F) of the assembly. Each guide wheel of a given pair is now in a staggered position with respect to its counterpart, which contributes to cancel simultaneous occurrences of impacts.

Along the guide rails 12, the guide wheels are laterally separated by a distance less than a distance separating two successive profiles of the track so as to avoid producing a simultaneity of impacts, and less than the pitch of the track so as to allow a sufficient time of impact between the guide wheels and the reinforcing rods.

It is found that the staggered position of the guide wheels as illustrated in FIG. 2(C) is all the more efficient in the noise-reduction as it is applied to the pairs 16c-16d, 16e-16f close to a point of attachment of the assembly (see FIG. 2C).

Moreover, the guide wheels may be mounted inside or outside the guide rails 12. It is found that such a position relative to the guide rails, when the guide wheels are located in the forward region (F) of the assembly, does not affect the noise generated. However, when the guide wheels are located further away from the forward region (F) of the assembly, either in the center region or in the rear region (R) thereof, a mounting of the guide wheels in between the guide rails 12 results in an increased production of noise.

As may be seen in FIG. 3(A), such an assembly as illustrated in FIG. 2(C) allows an overall noise reduction of up to 5 dB (A), and a reduction of up to 9 dB (A) of the main peak of the frequency spectrum (compare the spectrum measured with the present assembly comprising guide wheels in a forward position (F), the rear region (R) being devoid of guide wheels, in full line, with a spectrum measured with a conventional assembly as used in the art, in dotted line).

The assembly may further be improved by mounting clips in each profile of the ground-engaging surface of the track (not shown). As may be seen in FIG. 3(B), such an assembly is characterised by an overall noise attenuation of up to 7 dB (A), as well as by a decreasing effect on harmonics of the drive frequency of the track (compare the spectrum measured with the present improved assembly comprising clips in each profile in dotted line, with a spectrum measured with a conventional assembly comprising clips in each profile as used in the art, in full line).

It is further shown that providing the belt with apertures such as punch holes in between the profiles also reduces the sound level.

In FIG. 4, apertures 200 are provided on any part across the width of the endless body 100, on the central region (C) of the track 100, defined between the openings 190 for the driving wheels, and/or on the lateral parts (L) of the endless body 100, between traction lugs 120 of the ground engaging surface 110. Thus, in this embodiment, each of the apertures 200 occupies a part of the width of the track 100 which is other than any part of the width of the track 100 which is engaged by a driving wheel when the track 100 is driven. As such, in this embodiment, each aperture 200 is located such that no drive wheel tooth is received in that aperture when the track 100 is in motion.

Such openings 200 are distributed along the length of the endless body 100, between two traction lugs 120, or two reinforcing rods (not shown) if any, with at least one opening per quarter (¼) of the total length (1) of the endless body 110, as shown in FIG. 5. For example, in the embodiment shown in FIG. 4, a first through hole 200 is located longitudinally between a first traction lug 120 and a second traction lug 120 which succeeds the first traction lug 120 along the length of the track 100, a second through hole 200 is located longitudinally between the second traction lug 120 and a third traction lug 120 which succeeds the second traction lug 120 along the length of the track 100, and a third through hole 200 is located longitudinally between the third traction lug 120 and a fourth traction lug 120 which succeeds the third traction lug 120 along the length of the track 100. In this example, the first, second and third through holes 200 are located in the central portion (C) of the track 100. Also, in this example, the first, second and third through holes 200 are laterally offset from one another, with the centermost one of these holes 200 extending across a centerline which bisects the width of the track 100.

FIG. 6 illustrates results of sound produced by a tracked vehicle, according to a number of holes in its track belt. As can be seen, the sound level in dB is reduced when the track belt contains holes located in the center portion of the track belt (squares), and even more so when the track belt contains holes located both in the center and in the lateral portions of the track belt (triangles), compared to the case when the track belt is devoid of holes (diamonds), at least up to a speed of the vehicle of about 70 miles per hour, the three belts being otherwise identical. For instance, in this example, when the track contains holes, either only in its center portion or both in its center portion and its lateral portions, the noise level produced by the vehicle is less than that which is produced when the track lacks these holes, as the vehicle is operated at speeds between 20 miles per hour and 60 miles per hour, including between 40 miles per hour and 60 miles per hour where the reduction in noise level becomes greater. In particular, in this example, when the track contains holes, either only in its center portion or both in its center portion and its lateral portions, the noise level produced by the vehicle is at least 1.5 decibels less than that which is produced when the track lacks these holes, as the vehicle is operated at speeds between 50 miles per hour and 60 miles per hour.

Even a small number of through holes is found to reduce the noise level of the track, such as, for example, 96 through holes of a diameter of 1 inch on a belt of 15 inches wide, 121 inches long, which represent 0.28% of total area of the holes relative to the total area of the belt.

It could be contemplated removing the belt portions in between the traction lugs altogether, for a maximised decrease of noise production.

The shape of the holes does not matter, as far as the endless body of the track is removed at places and the track thereby provided with though holes, open from the ground-engaging surface to the inner surface of the endless belt body. For example, in the embodiment shown in FIG. 4, each of the holes 200 has a generally rectangular shape. Also, in this embodiment, each of the holes is elongated along the width of the track 100, i.e., it is longer along the width of the track 100 than along the length of the track 100.

A track assembly of the present invention may combine a forward position of the guide wheels as described earlier hereinabove, with an endless track body provided with open holes, as just described, for an increased reduction of noise production.

Interestingly, people in the art will appreciate that with such a forward position of the guide wheels further contributes to reducing and preventing wear out of the guide rails, which is known to occur especially in a front region.

Therefore, there is provided a track assembly comprising guide wheels in a region of greatest impacts on the guide rails of the track, which are also the regions of greater wear out of the guide rails, the guide wheels being further arranged in a staggered position.

The track assembly may further comprise clips mounted in each profile of the ground-engaging surface of the track, which results in a larger distance between the track and the guide wheels, thereby reducing a force of impact during contacts between rods and wheels.

Although the present invention has been described hereinabove by way of embodiments thereof, it may be modified, without departing from the nature and teachings of the subject invention as described herein.

What is claimed is:

1. An endless snowmobile track for traction of a snowmobile, the snowmobile comprising a plurality of drive wheels for imparting motion to the endless snowmobile track, the endless snowmobile track comprising:
   an inner side for facing the drive wheels;
   a ground-engaging outer side for engaging the ground;
   a central portion for passing between a first one of the drive wheels and a second one of the drive wheels; and
   a plurality of noise-reducing through holes distributed along the endless snowmobile track for reducing noise generated when the endless snowmobile track is in motion, each noise-reducing through hole:
   extending through the endless snowmobile track from the inner side to the ground-engaging outer side; and
   being located such that no drive wheel tooth is received in the noise-reducing through hole when the endless snowmobile track is in motion;
   at least one of the noise-reducing through holes being located in the central portion of the endless snowmobile track;
   wherein, when the snowmobile is operated in a range of speeds, a noise level produced is less than that which would be produced if the endless snowmobile track lacked the noise-reducing through holes, but was otherwise identical.

2. The endless snowmobile track as claimed in claim 1, the range of speeds including speeds from 40 miles per hour to 60 miles per hour.

3. The endless snowmobile track as claimed in claim 1, the noise level produced when the snowmobile is operated between 50 miles per hour and 60 miles per hour being at least 1.5 decibels less than that which would be produced if the endless snowmobile track lacked the noise-reducing through holes but was otherwise identical.

4. The endless snowmobile track as claimed in claim 1, wherein there is at least one of the noise-reducing through holes per quarter of a length of the endless snowmobile track.

5. The endless snowmobile track as claimed in claim 1, wherein the noise-reducing through holes collectively occupy an area corresponding to 0.28% of a total area of the endless snowmobile track.

6. The endless snowmobile track as claimed in claim 1, comprising a plurality of traction profiles projecting from the ground-engaging outer side, the traction profiles being spaced apart along a longitudinal direction of the endless snowmobile track and including a first traction profile, a second traction profile succeeding the first traction profile along the longitudinal direction of the endless snowmobile track, and a third traction profile succeeding the second traction profile along the longitudinal direction of the endless snowmobile track, the noise-reducing through holes including a first noise-reducing through hole located longitudinally between the first traction profile and the second traction profile and a second noise-reducing through hole located longitudinally between the second traction profile and the third traction profile.

7. The endless snowmobile track as claimed in claim 6, each of the first noise-reducing through hole and the second noise-reducing through hole being located in the central portion of the endless snowmobile track.

8. The endless snowmobile track as claimed in claim 6, the traction profiles including a fourth traction profile succeeding the third traction profile along the longitudinal direction of the endless snowmobile track, the noise-reducing through holes including a third noise-reducing through hole located longitudinally between the third traction profile and the fourth traction profile.

9. The endless snowmobile track as claimed in claim 8, each of the first noise-reducing through hole, the second noise-reducing through hole and the third noise-reducing through hole being located in the central portion of the endless snowmobile track.

10. The endless snowmobile track as claimed in claim 1, the endless snowmobile track comprising:
    a first lateral edge and a second lateral edge opposite one another;
    a first lateral portion between the central portion and the first lateral edge; and
    a second lateral portion between the central portion and the second lateral edge;
    at least one of the noise-reducing through holes being located in one of the first lateral portion and the second lateral portion of the endless snowmobile track.

11. The endless snowmobile track as claimed in claim 1, each noise-reducing through hole being a punched hole.

12. The endless snowmobile track as claimed in claim 1, the endless snowmobile track having a length, a ratio of the number of noise-reducing through holes to the length of the endless snowmobile track being at least 0.8 noise-reducing hole per inch.

13. The endless snowmobile track as claimed in claim 1, at least some of the noise-reducing through holes having a generally rectangular shape.

14. The endless snowmobile track as claimed in claim 1, at least some of the noise-reducing through holes having a width that is at least $\frac{1}{15}$ of a width of the endless snowmobile track.

15. The endless snowmobile track as claimed in claim 1, comprising a plurality of openings for the drive wheels, the openings being arranged in a first row and a second row that are spaced apart from one another along a width of the endless snowmobile track.

16. A snowmobile comprising the endless snowmobile track as claimed in claim 1.

17. The endless snowmobile track as claimed in claim 1, wherein individual ones of the noise-reducing through holes are located in the central portion of the endless snowmobile track.

18. The endless snowmobile track as claimed in claim 1, the endless snowmobile track having a centerline bisecting a width of the endless snowmobile track, at least one of the noise-reducing through holes extending across the centerline of the endless snowmobile track.

19. The endless snowmobile track as claimed in claim 1, at least some of the noise-reducing through holes being elongated along a width of the endless snowmobile track.

20. An endless snowmobile track for traction of a snowmobile, the snowmobile comprising at least one drive wheel for driving the endless snowmobile track, the endless snowmobile track having a length and a width and comprising:
    an inner side for facing the at least one drive wheel;
    a ground-engaging outer side for engaging the ground; and
    a plurality of noise-reducing through holes distributed along the endless snowmobile track for reducing noise generated when the endless snowmobile track is driven, each noise-reducing through hole:
    extending through the endless snowmobile track from the inner side to the ground-engaging outer side; and
    occupying a part of the width of the endless snowmobile track which is other than any part of the width of the endless snowmobile track which is engaged by a drive wheel when the endless snowmobile track is driven;
    wherein, when the snowmobile is operated in a range of speeds, a noise level produced is less than that which would be produced if the endless snowmobile track lacked the noise-reducing through holes, but was otherwise identical.

21. The endless snowmobile track as claimed in claim 20, the range of speeds including speeds from 50 miles per hour to 60 miles per hour.

22. The endless snowmobile track as claimed in claim 20, the range of speeds including speeds from 40 miles per hour to 60 miles per hour.

23. The endless snowmobile track as claimed in claim 20, the range of speeds including speeds from 20 miles per hour to 60 miles per hour.

24. The endless snowmobile track as claimed in claim 20, the noise level produced when the snowmobile is operated between 50 miles per hour and 60 miles per hour being at least 1.5 decibels less than that which would be produced if the endless snowmobile track lacked the noise-reducing through holes but was otherwise identical.

25. The endless snowmobile track as claimed in claim 20, wherein there is at least one of the noise-reducing through holes per quarter of the length of the endless snowmobile track.

26. The endless snowmobile track as claimed in claim 20, wherein the noise-reducing through holes collectively occupy an area corresponding to 0.28% of a total area of the endless snowmobile track.

27. The endless snowmobile track as claimed in claim 20, the at least one drive wheel being a plurality of drive wheels, the endless snowmobile track comprising a central portion for passing between a first one of the drive wheels and a second one of the drive wheels, the first one of the drive wheels and the second one of the drive wheels being spaced apart from one another along the width of the endless snowmobile track, at least one of the noise-reducing through holes being located in the central portion of the endless snowmobile track.

28. The endless snowmobile track as claimed in claim 27, the endless snowmobile track comprising:
    a first lateral edge and a second lateral edge opposite one another;
    a first lateral portion between the central portion and the first lateral edge; and
    a second lateral portion between the central portion and the second lateral edge;
    at least one of the noise-reducing through holes being located in one of the first lateral portion and the second lateral portion of the endless snowmobile track.

29. The endless snowmobile track as claimed in claim 27, wherein individual ones of the noise-reducing through holes are located in the central portion of the endless snowmobile track.

30. The endless snowmobile track as claimed in claim 20, comprising a plurality of traction profiles projecting from the ground-engaging outer side, the traction profiles being spaced apart along the length of the endless snowmobile track and including a first traction profile, a second traction profile succeeding the first traction profile along the length of the endless snowmobile track, and a third traction profile succeeding the second traction profile along the length of the endless snowmobile track, the noise-reducing through holes including a first noise-reducing through hole located longitudinally between the first traction profile and the second traction profile and a second noise-reducing through hole located longitudinally between the second traction profile and the third traction profile.

31. The endless snowmobile track as claimed in claim 30, the at least one drive wheel being a plurality of drive wheels, the endless snowmobile track comprising a central portion for passing between a first one of the drive wheels and a second one of the drive wheels, the first one of the drive wheels and the second one of the drive wheels being spaced apart from one another along the width of the endless snowmobile track, each of the first noise-reducing through hole and the second noise-reducing through hole being located in the central portion of the endless snowmobile track.

32. The endless snowmobile track as claimed in claim 30, the traction profiles including a fourth traction profile succeeding the third traction profile along the length of the endless snowmobile track, the noise-reducing through holes including a third noise-reducing through hole located longitudinally between the third traction profile and the fourth traction profile.

33. The endless snowmobile track as claimed in claim 32, the at least one drive wheel being a plurality of drive wheels, the endless snowmobile track comprising a central portion for passing between a first one of the drive wheels and a second one of the drive wheels, the first one of the drive wheels and the second one of the drive wheels being spaced apart from one another along the width of the endless snowmobile track, each of the first noise-reducing through hole, the second noise-reducing through hole and the third noise-reducing through hole being located in the central portion of the endless snowmobile track.

34. The endless snowmobile track as claimed in claim 20, each noise-reducing through hole being a punched hole.

35. The endless snowmobile track as claimed in claim 20, a ratio of the number of noise-reducing through holes to the length of the endless snowmobile track being at least 0.8 noise-reducing hole per inch.

36. The endless snowmobile track as claimed in claim 20, at least some of the noise-reducing through holes having a generally rectangular shape.

37. The endless snowmobile track as claimed in claim 20, at least some of the noise-reducing through holes having a width that is at least 1/15 of the width of the endless snowmobile track.

38. The endless snowmobile track as claimed in claim 20, the at least one drive wheel being a plurality of drive wheels, the endless snowmobile track comprising a plurality of openings for the drive wheels, the openings being arranged in a first row and a second row that are spaced apart from one another along the width of the endless snowmobile track.

39. The endless snowmobile track as claimed in claim 20, the endless snowmobile track having a centerline bisecting the width of the endless snowmobile track, at least one of the noise-reducing through holes extending across the centerline of the endless snowmobile track.

40. The endless snowmobile track as claimed in claim 20, at least some of the noise-reducing through holes being elongated along the width of the endless snowmobile track.

41. A snowmobile comprising the endless snowmobile track as claimed in claim 20.

42. An endless snowmobile track for traction of a snowmobile, the snowmobile comprising a plurality of drive wheels for driving the endless snowmobile track, the endless snowmobile track having a length and a width and comprising:

an inner side for facing the drive wheels;
a ground-engaging outer side for engaging the ground;
a first row of openings that extend through the endless snowmobile track from the inner side to the ground-engaging outer side;
a second row of openings that extend through the endless snowmobile track from the inner side to the ground-engaging outer side, the second row of openings being spaced apart from the first row of openings along the width of the endless snowmobile track;
a central portion between the first row of openings and the second row of openings; and
a plurality of noise-reducing through holes distributed along the endless snowmobile track for reducing noise generated when the endless snowmobile track is driven, each noise-reducing through hole:
extending through the endless snowmobile track from the inner side to the ground-engaging outer side; and
occupying a part of the width of the endless snowmobile track which is other than any part of the width of the endless snowmobile track which is engaged by a drive wheel when the endless snowmobile track is driven;
at least one of the noise-reducing through holes being located in the central portion of the endless snowmobile track
wherein, when the snowmobile is operated in a range of speeds, a noise level produced is less than that which would be produced if the endless snowmobile track lacked the noise-reducing through holes, but was otherwise identical.

43. The endless snowmobile track as claimed in claim 42, the range of speeds including speeds from 50 miles per hour to 60 miles per hour.

44. The endless snowmobile track as claimed in claim 42, the range of speeds including speeds from 40 miles per hour to 60 miles per hour.

45. The endless snowmobile track as claimed in claim 42, the range of speeds including speeds from 20 miles per hour to 60 miles per hour.

46. The endless snowmobile track as claimed in claim 42, the noise level produced when the snowmobile is operated between 50 miles per hour and 60 miles per hour being at least 1.5 decibels less than that which would be produced if the endless snowmobile track lacked the noise-reducing through holes but was otherwise identical.

47. The endless snowmobile track as claimed in claim 42, comprising a plurality of traction profiles projecting from the ground-engaging outer side, the traction profiles being spaced apart along the length of the endless snowmobile track and including a first traction profile, a second traction profile succeeding the first traction profile along the length of the endless snowmobile track, and a third traction profile succeeding the second traction profile along the length of the endless snowmobile track, the noise-reducing through holes including a first noise-reducing through hole located longitudinally between the first traction profile and the second traction profile and a second noise-reducing through hole located longitudinally between the second traction profile and the third traction profile.

48. The endless snowmobile track as claimed in claim 47, each of the first noise-reducing through hole and the second noise-reducing through hole being located in the central portion of the endless snowmobile track.

49. The endless snowmobile track as claimed in claim 47, the traction profiles including a fourth traction profile succeeding the third traction profile along the length of the endless snowmobile track, the noise-reducing through holes including a third noise-reducing through hole located longitudinally between the third traction profile and the fourth traction profile.

50. The endless snowmobile track as claimed in claim 49, each of the first noise-reducing through hole, the second noise-reducing through hole and the third noise-reducing through hole being located in the central portion of the endless snowmobile track.

51. The endless snowmobile track as claimed in claim 42, a ratio of the number of noise-reducing through holes to the length of the endless snowmobile track being at least 0.8 noise-reducing hole per inch.

52. The endless snowmobile track as claimed in claim 42, at least some of the noise-reducing through holes having a width that is at least 1/15 of the width of the endless snowmobile track.

53. The endless snowmobile track as claimed in claim 42, wherein individual ones of the noise-reducing through holes are located in the central portion of the endless snowmobile track.

54. A snowmobile comprising the endless snowmobile track as claimed in claim 42.

* * * * *